(12) United States Patent
Reynolds (10) Patent No.: US 10,970,511 B2
(45) Date of Patent: Apr. 6, 2021

(54) SYSTEM AND METHOD FOR CORRECTING DISTORTIONS IN A BIOMETRIC IMAGE

(71) Applicant: SYNAPTICS INCORPORATED, San Jose, CA (US)

(72) Inventor: Joseph Kurth Reynolds, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/453,746

(22) Filed: Jun. 26, 2019

(65) Prior Publication Data

US 2020/0410206 A1  Dec. 31, 2020

(51) Int. Cl.
*G06K 9/00* (2006.01)
*G06K 9/03* (2006.01)
*G06F 21/32* (2013.01)
*G06K 9/78* (2006.01)

(52) U.S. Cl.
CPC ......... *G06K 9/00026* (2013.01); *G06F 21/32* (2013.01); *G06K 9/00892* (2013.01); *G06K 9/03* (2013.01); *G06K 9/78* (2013.01)

(58) Field of Classification Search
CPC ... G06K 9/00006–0012; G06K 7/1473; G06K 9/00–82; G06K 19/06075; G06K 2009/363; G06K 9/00026; G06K 9/00892; G06K 9/03; G06K 9/78; G02B 27/0025; G02B 2027/011; G06T 5/006; H04N 5/3572–35721; G06F 21/32
USPC ........................................................ 382/124
See application file for complete search history.

(56) References Cited

U.S. PATENT DOCUMENTS

| | | | |
|---|---|---|---|
| 6,407,804 B1 * | 6/2002 | Hillmann | G06K 9/00013 356/71 |
| 8,768,013 B2 | 7/2014 | Fenrich | |
| 2005/0169506 A1 | 8/2005 | Fenrich et al. | |
| 2017/0124687 A1 * | 5/2017 | McCloskey | G06K 7/1456 |
| 2017/0262163 A1 * | 9/2017 | Nimura | G06K 9/3275 |
| 2018/0288325 A1 * | 10/2018 | Tsang | H04N 13/239 |

* cited by examiner

*Primary Examiner* — Amr A Awad
*Assistant Examiner* — Aaron Midkiff
(74) *Attorney, Agent, or Firm* — Leydig, Voit & Mayer, Ltd.

(57) ABSTRACT

A system and method for correcting distortions within a biometric image. The biometric image is generated from first sensor data acquired from a sensing device. The first sensor data may include distortions generated in response to a change in distance or tilt between elements of a corresponding electronic device. Further, second sensor data corresponding to a calibration image is acquired from the sensing device. A corrected biometric image is generated based at least in part on the biometric image and the sensor data.

20 Claims, 10 Drawing Sheets

SYSTEM AND METHOD FOR CORRECTING DISTORTIONS IN A BIOMETRIC IMAGE

BACKGROUND

Field

Embodiments disclosed herein generally relate to electronic devices, and more specifically, to correcting distortions in an image of an input object.

Description of the Related Art

Biometric sensing devices including image sensor devices may be used in a variety of electronic systems. An image sensor device may include a sensing region, demarked by a surface, in which the image sensor device determines the presence, location, force and/or motion of one or more input objects. Image sensor devices may be used to provide interfaces for the electronic system. For example, image sensor devices may be used as input devices for larger computing systems, such as touchpads integrated in, or peripheral to, notebook or desktop computers. Image sensor devices may also often be used in smaller computing systems, such as touch screens integrated in cellular phones.

SUMMARY

In one embodiment, a method for compensation for distortion in a biometric image comprises acquiring first sensor data from a sensing device and generating the biometric image based at least in part on the first sensor data. The method further comprises acquiring second sensor data from the sensing device and generating a corrected biometric image based at least in part on the biometric image and the second sensor data. The second sensor data corresponding to a calibration image.

In one embodiment, an electronic device includes a display device, a sensor and a processing system. The processing system is coupled to the sensor and is configured to receive first sensor data from the sensor. The processing system is further configured to generate a biometric image based at least in part on the first sensor data. Additionally, the processing system acquires second sensor data with the plurality of sensing electrodes and generates a corrected biometric image based at least in part on the biometric image and the second sensor data. The second sensor data corresponding to a calibration image.

In one embodiment, the processing system for a biometric device comprises a sensor module and a determination module. The sensor module comprises sensor circuitry. The sensor module is configured to receive first sensor data from a plurality of sensing elements, and receive second sensor data from the plurality of sensing elements while a calibration image is displayed. The second sensor data corresponds to the calibration image. The determination module is configured to generate a biometric image from the first sensor data, and generate a corrected biometric image based at least in part on the biometric image and the second sensor data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

In various embodiments, a biometric sensing device includes an image sensor device configured to obtain one or more images of an input object. The biometric sensing device may be configured to remove distortions within the acquired biometric images, thereby increasing the likelihood that the user will be properly identified and/or authenticated by the biometric sensing device. The distortions may be due to a change in distance between a sensing surface of the biometric device and the image sensor device caused by a force applied by the input object. The input object may be a finger, palm, whole hand, partial hand, or the like. The image sensor device may be an imager with collimation and the image may be an optical image.

Figure 1A:
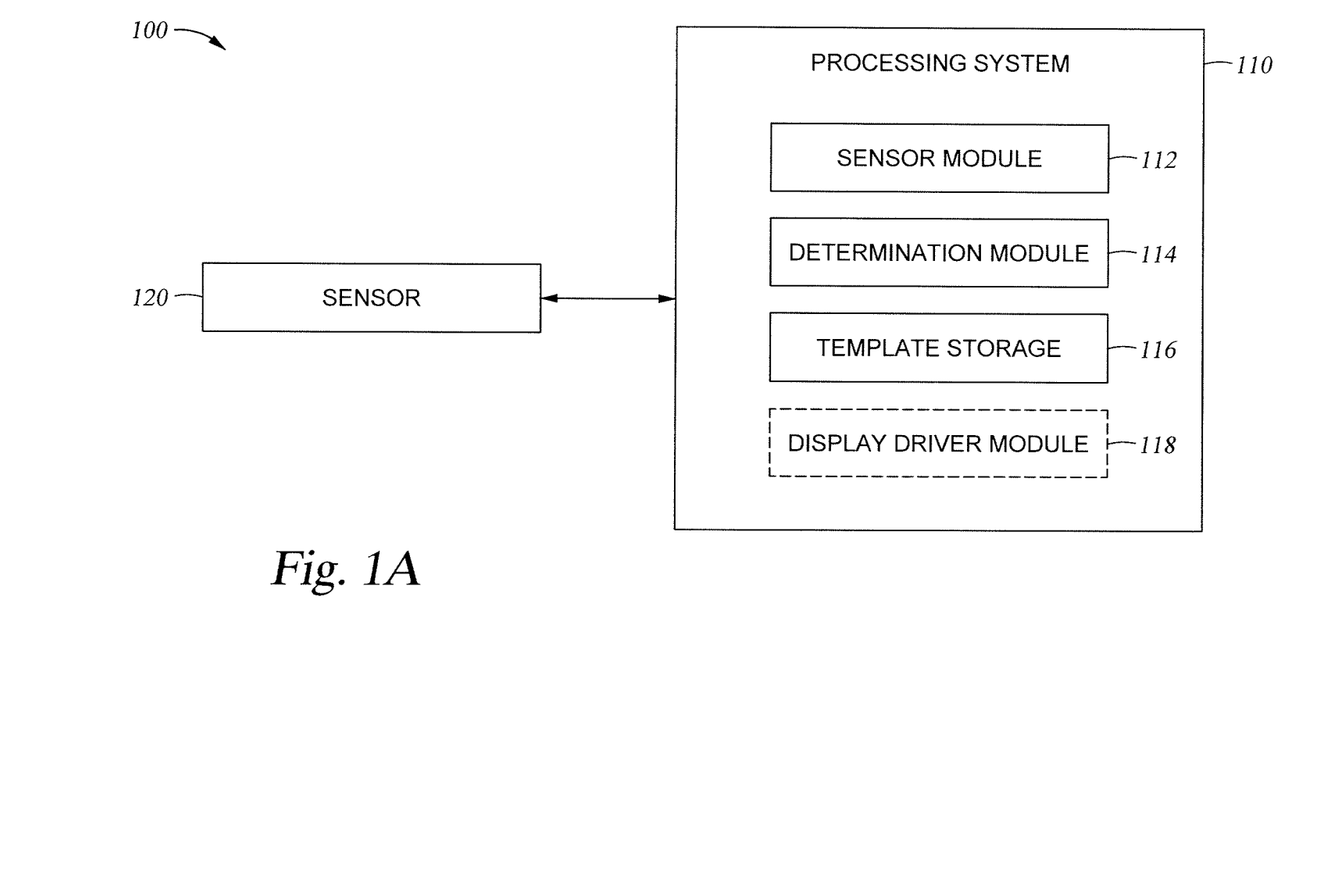
FIG. 1A is a schematic block diagram of a biometric device, according to one or more embodiments.

FIG. 1A illustrates a biometric sensing device 100. The biometric sensing device 100 includes a sensor 120 and a processing system 110. The biometric sensing device 100 may be configured to utilize one or more various biometric sensing methods, techniques, and/or devices to acquire an image of one or more features of an input object. The images of the one or more features of an input object may be referred to as a biometric image. In one embodiment, the biometric sensing device 100 may be configured to acquire images of features of a fingerprint such as ridges, valleys, minutiae, etc. Such images may be referred to as fingerprint images.

In various embodiments, the biometric sensing device 100 may be configured to acquire biometric images of an input object for authentication of the user within an electronic system. For example, the biometric sensing device 100 may be configured to utilize biometric images to grant or reject a user's access to an electronic device, e.g., a mobile phone, a tablet, a laptop, a personal computer, or the like. The term "authentication" may refer to authentication, verification, validation, certification, and/or authorization.

The sensor 120 may be any sensing device configured to capture reflected light from a sensing surface. In one embodiment, the sensor 120 includes a plurality of photodetectors configured to capture reflected light. For example, the sensor 120 may include a plurality of photodiodes. In one or more embodiments, each photodetector corresponds to a pixel of the sensor 120. Alternatively, the photodetectors may be grouped to form the pixels of the sensor 120 such that each pixel is formed from two or more photodetectors. Further, the sensor 120 may include a collimator with lens having a depth of field. In one embodiment, the sensor 120 is an imaging device such as a camera. For example, the sensor 120 may include complementary metal-oxide semiconductor (CMOS) image sensor, charge-coupled device (CCD) image sensors, or the like. In such embodiments, the sensor 120 may include a plurality of pixels arrayed in 2 dimensions and configured to receive reflected or transmitted light from an input object.

In one or more embodiments, the sensor 120 may utilize principles of direct illumination of the input object, which may or may not be in contact with an input surface of the sensing area depending on the configuration. One or more light sources and/or light guiding structures (e.g., collimator, lenses, reflectors, etc.) may be used to direct light to a sensing region of the sensing region. For example a portion of a display may provide light to the area. In this description, "sensing area" refers to an area where the sensing region above the imaging system can detect, whether in or out of focus or in/out of illumination may provide light, while "sensing region" refers to an area in focus or an illuminated area. In one embodiment, illumination of the input object may be provided by TIR (Total Internal Reflection) from outside the display or from within (i.e., light source is the display). When an input object is proximate to the sensing area, light is reflected from surfaces of the input object, which reflections can be detected by the sensing elements of the sensor 120 and used to determine information about the input object. Alternatively, sensor 120 may image the light absorbed by the input object (i.e., not reflected from the cover layer of the biometric device). Note that either the light reflected by the input object may be imaged (bright field) or the absorption of the light, not reflected at the input object contact points with the cover layer may be imaged (dark field).

In one embodiment, the display device 160 may include a glass or plastic (e.g. Polyimide) substrate for TFT circuitry and/or other circuitry, which may be used to provide visuals and/or provide other functionality. The display device 160 may also include a cover layer disposed above display circuitry which may also provide an input surface for the sensor 120. The cover layer may include a cover lens, sometimes referred to as a cover glass, or lens. Example cover lens materials include optically clear amorphous solids, such as chemically hardened glass, as well as optically clear crystalline structures, such as sapphire. Flexible cover layers may be composed of polymer such as PET (Polyethylene Terephthalate), clear Polyimide, as well as polyurethane or other hard coatings. In one embodiment, the cover layer may function as a sensing surface, e.g., a surface where an input object is positioned to be sensed by the sensor 120.

In one embodiment, the display device 160 may be configured to display a calibration image. The calibration image (e.g., calibration image 180 of FIG. 1C) may include a repeating pattern of elements 182 that may be utilized by the processing system 110 to remove distortions from a biometric image. The calibration image may include a regular or irregular (e.g. encoded) pattern of elements 182. Further, the calibration image may include a pattern one or more dots, lines, bars, circles, squares, rectangles, and/or any other shape. In one embodiment, as will be discussed in further detail in the following, the calibration image 180 may be imaged (e.g. by internal reflection at or near the sensing surface) by biometric sensing device 100 and utilized to by the processing system 110 to remove one or more distortions from a fingerprint image.

In one embodiment, the sensor 120 may be coupled to substrate 170 of the electronic device 150. For example, the sensor 120 may be coupled to the substrate 170 through one or more adhesive layers. In one embodiment, the substrate 170 may be part of the frame of the electronic device 150. For example, the substrate 170 may be part of the mid-frame of the electronic device 150.

With further reference to FIG. 1A, the processing system 110 may be electronically (e.g., electrically, communicatively) coupled to the sensor 120 and configured to control the sensor 120 to acquire sensor data which may be utilized to generate images. For example, the processing system 110 may be electrically coupled to the sensor 120 via one or more traces (not shown) of a substrate (e.g., the substrate 170 of FIG. 1B or the substrate 171 of FIG. 1C).

The processing system 110 includes a sensor module 112, a determination module 114, and template storage 116. Further, the processing system 110 may include an optional display driver module 118. In one or more embodiments, the processing system 110 comprises parts of or all of one or more integrated circuit (ICs) chips and/or other circuitry components.

The sensor module 112 may include sensing circuitry configured to receive sensor data from the sensor 120. Further, the sensor module 112 may instruct the sensor 120 to acquire the sensor data. In one embodiment, the sensor data is raw data received from the sensor 120. For example, the sensor data may be unprocessed before it is received by the sensor module 112. In other embodiments, the sensor data is raw data that is not substantially processed before being received from the sensor 120. For example, the sensor data may be filtered, converted from an analog domain to a digital domain, or the like by the sensor 120 before being communicated to the sensor module 112.

The determination module 114 may be configured to process the sensor data. For example, the determination module 114 may correct for one or more distortions within the sensor data, and generate corrected biometric images which may be used for user authentication, identification, or the like. In one embodiment, correcting for distortions may include at least one of minimizing and removing effects of the distortions within the sensor data prior to the generation of a biometric image. In other embodiments, correcting for distortions may include at least one of minimizing and removing effects of the distortions from a biometric image.

In one embodiment, the determination module 114 compares the corrected biometric images with the templates stored within the template storage 116. The determination module 114 may authenticate or identify a user based on the determination that one or more of the templates match the corrected biometric image. In other embodiments, the determination module 114 communicates the corrected biometric image and the one or more matching templates to a processor external to the processing system 110 for user authentication and/or identification. In one embodiment, the determination module 114 communicates the corrected biometric image to a processor external to the processing system 110 for template matching and user authentication and/or identification. The determination module 114 may also be configured to generate user templates from sensor data received with sensor 120 and store the user templates within template storage 116.

The template storage 116 may comprise one or more non-transient computer-readable storage media. The template storage 116 may be configured to store enrollment views, e.g., user templates, for biometric images of a user's fingerprint. The template storage 116 may further be configured for long-term storage of information. In some examples, the template storage 116 includes non-volatile storage elements. Non-limiting examples of non-volatile storage elements include magnetic hard discs, optical memory devices, solid state memory device, flash memories, magnetic memory devices, or forms of electrically programmable memories (EPROM) or electrically erasable and programmable (EEPROM) memories.

In one embodiment, the determination module 114 compares fingerprint images generated from sensor data received with the sensor 120 with user templates stored within template storage 116 to determine whether or not to authenticate a user. When a user is authenticated, the user may be provided with access to an electronic device, e.g., electronic device 150 along with the data and programs on the device. The determination module 114 may also be configured to generate user templates from sensor data received with sensor 120 and store the user templates within template storage 116.

Figure 1B:
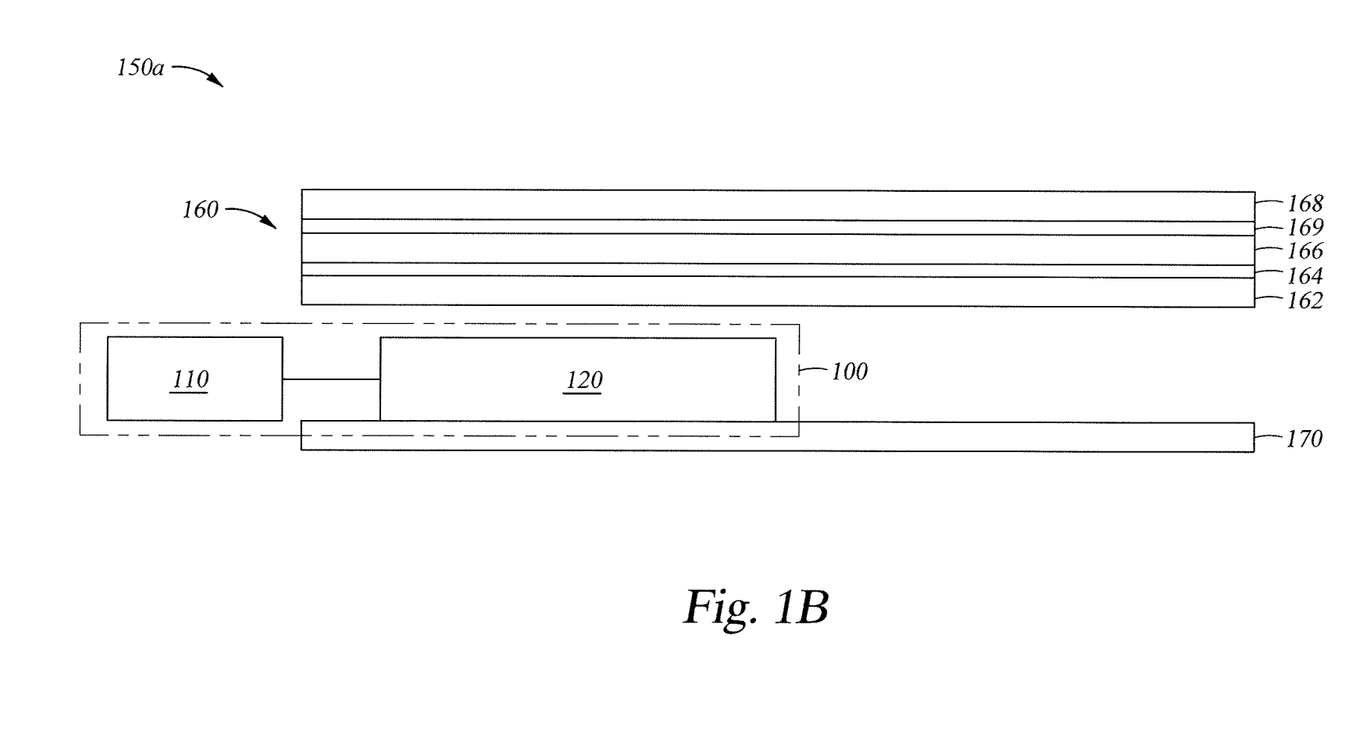
FIGS. 1B and 1C are schematic block diagrams of an electronic device, according to one or more embodiments.

The display driver module 118 includes display driver circuitry configured to control updating of the display of a display device (e.g., the display device 160 of FIG. 1B). For example, the display driver module 118 may drive update signals onto the elements of the display of display device 160 to update a displayed image. The display driver module 118 may include one or more source drivers, a display timing controller, and/or gate selection circuitry which may be used to receive display data, generate display update signals, and drive the display update signals onto the display to update the display. In one embodiment, the display driver module 118 may drive one or more organic light emitting diode (OLED) pixels of the display device 160 to provide illumination for sensor 120 when capturing a biometric image and/or an image of a sensing surface.

FIG. 1B illustrates an electronic device 150a, according to one or more embodiments. The electronic device 150a may be a computing device such as a mobile phone, tablet, laptop, personal computer, or the embodiment illustrated, the electronic device 150a includes a display device 160 and the biometric sensing device 100. In some embodiments, the sensor 120 is configured to detect input objects over at least part of an active area of a display of the display device 160. The active area of the display may correspond to an area of the display where images are displayed. The display device 160 may be any type of display capable of displaying a visual interface to a user, and may include any type of light emitting diode (LED), The display device 160 may also be foldable, flexible or rigid, and may be flat, curved, or have other geometries.

In one embodiment, the display device 160 includes substrate 162, display circuitry 164, pixels 166 and cover layer 168. The substrate 162 may be a glass or plastic substrate. The display circuitry 164 may be disposed within one or more layers of the substrate 162. The display circuitry 164 may include TFT circuitry and/or other circuitry. The display circuitry 164 may include one or more transistors and capacitors, among others. The display circuitry 164 is coupled to the pixels 166 and controls the brightness of each of the pixels 166. Each of the pixels 166 includes one or more subpixels. The subpixels of each pixel 166 are driven to a predetermined brightness level to set one or more of the brightness and color output by each pixel 166.

In one embodiment, the display circuitry 164 is coupled to data lines, gate lines and emission lines disposed within one or more layers of the substrate 162. Display update signals are driven onto the subpixels of each pixel 166 via the data lines, gate lines and emission control lines to update an image displayed by the display of the display device 160. For example, gate select signals may be driven on the gate lines to select and deselect the pixels 166 for display updating. Pixel data signals are driven on the selected pixels via the data lines to update the image displayed by the display of the display device 160. Further, emission control signals may be driven on the emission control lines to control the overall brightness of the display of the display device 160. In one embodiment, the display driver module 118 is coupled to the display circuitry 164 and is configured to drive the display update signals.

The electronic device 150a may also include a cover layer 168 disposed over the display device 160. The cover layer 168 may be coupled to the display device 160 via an optically clear adhesive (OCA) layer 169. The cover layer 168 may include a cover lens, sometimes referred to as a cover glass, or lens. Example cover lens materials include optically clear amorphous solids, such as chemically hardened glass or polymers such as clear polyimides (e.g., with hard coatings), as well as optically clear crystalline structures, such as sapphire. In one embodiment, the cover layer 168 may function as a sensing surface, e.g., a surface where an input object is positioned to be sensed by the sensor 120. Alternatively, one or more optional layers may be disposed over the cover layer 168. The optional layers may include one or more sensor electrode layers for a capacitive sensing device, an input surface, or the like.

In one embodiment, the sensor 120 may be coupled to substrate 170 of the electronic device 150a. For example, the sensor 120 may be coupled to the substrate 170 through one or more adhesive layers (not shown). In one embodiment, the substrate 170 is a flexible printed circuit board (FPC). In one embodiment, the display device 160 is coupled to the substrate 170 via an adhesive at selected points of the display device 160 (e.g., edges of the display device 160) to minimize strain. In one embodiment, the substrate 170 is adhered to the frame (not shown) of the display device 160. For example, the substrate 170 may be adhered to the mid-frame (not shown) of the display device 160.

In one embodiment, distortions within the sensor data may be caused in response to a change of a distance and/or tilt between one or more layers of the display device 160 and the sensor 120. For example, a change in the distance and/or tilt between the sensor 120 and one or more of the substrate 162, the display circuitry 164, and the pixels 166 may cause distortions within the sensor data. Further, the distortions within the sensor data may be caused in response to a change of a distance and/or tilt between the sensor 120 and the cover layer 168.

Figure 1C:
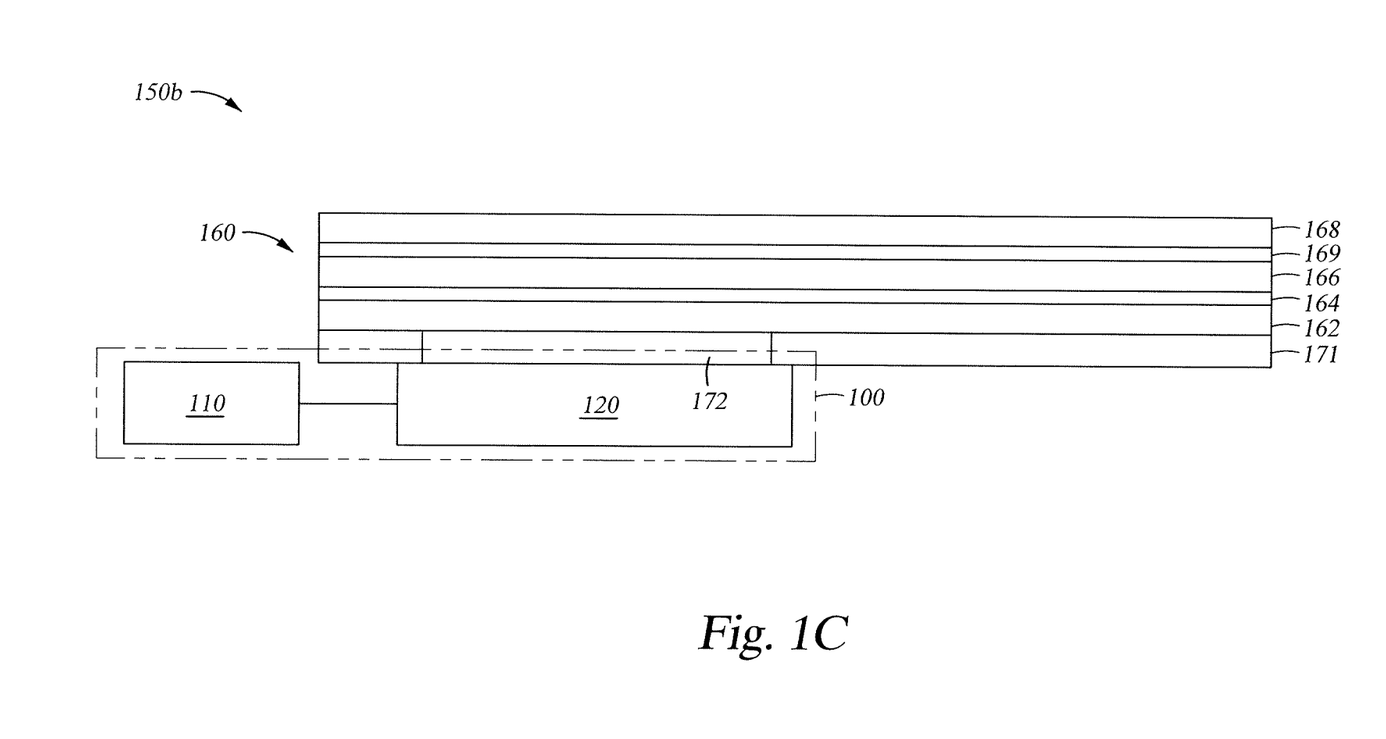

FIG. 1C illustrates an electronic device 150b, according to one or more embodiments. The electronic device 150b is configured similar to that of the electronic device 150a of FIG. 1B, however, while the sensor 120 is disposed between the substrate 170 and the display device 160 in the embodiment of FIG. 1B, in the embodiment of FIG. 10, a first side of the substrate 171 is adhered to the display device 160 and the sensor 120 is adhered to a second side of the substrate 171. Further, the substrate 171 includes an opening 172 over the sensor 120 to allow reflected light to travel to the sensor 120.

In one embodiment, the substrate 171 may be part of the frame (not shown) of the display device 160. For example, the substrate 171 may be part of the mid-frame of the display device 160.

Figure 1D:
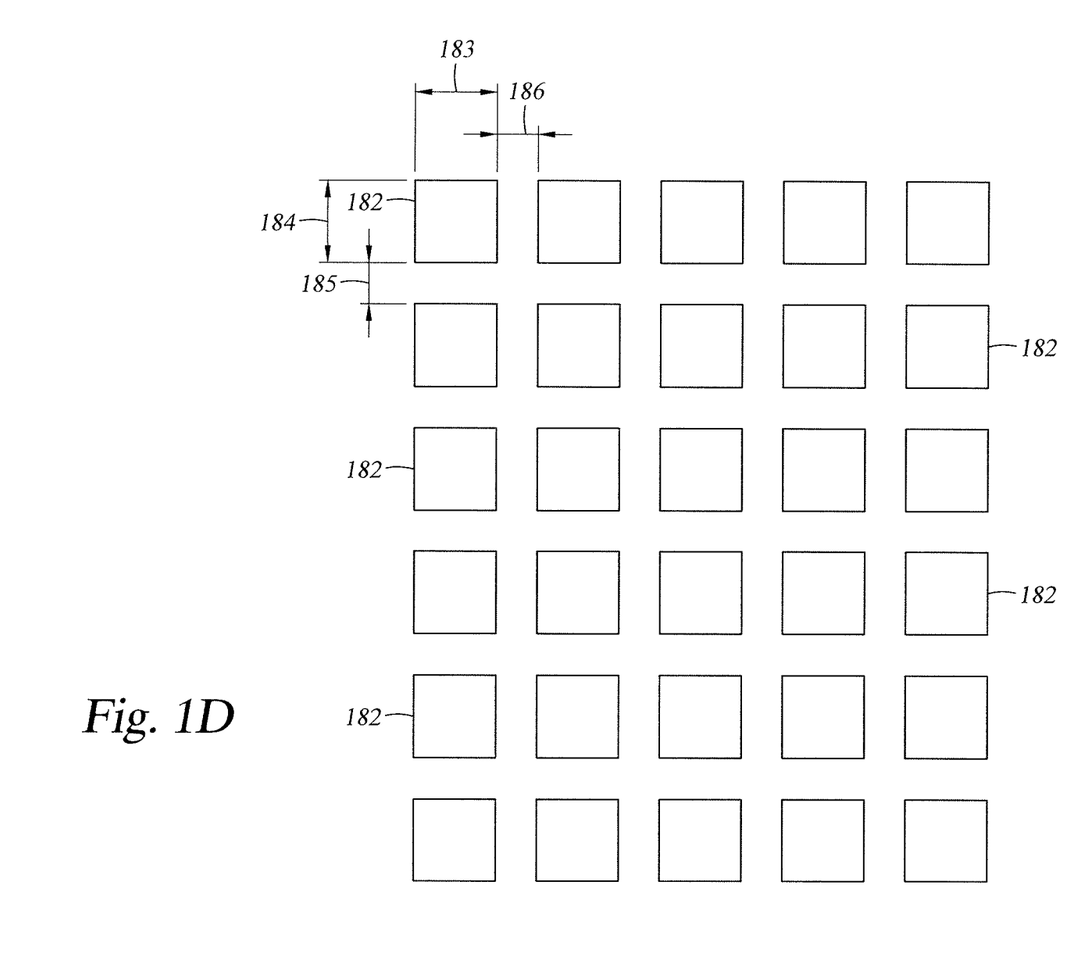
FIG. 1D illustrates an example calibration image, according to one or more embodiments.

In one embodiment, the display device 160 may be configured to display a calibration image, shown in FIG. 1D. For example, the calibration image 180 may be displayed on one or more layers of the display device 160 or on a layer external to the display device 160 (e.g., the cover layer 168 or the OCA layer 169). The calibration image 180 may include a repeating pattern or non-repeating pattern of elements (e.g., elements 182) that may be utilized by the processing system 110 (FIG. 1A) to remove, compensate, or correct distortions from an acquired image. Alternatively, the elements of the calibration image 180 may be randomly or pseudo-randomly positioned within the calibration image 180. In one embodiment, the calibration image 180 may be displayed on the cover layer 168 (FIGS. 1B, 1C). For example, the calibration image 180 may be displayed on either side of the cover layer 168. In other embodiments, the calibration image 180 may be displayed on a layer of the display device 160 between the pixels 166 (FIGS. 1B, 1C) and the cover layer 168. For example, the calibration image 180 may be displayed on the OCA layer 169 (FIGS. 1B, 1C). Further, in various embodiments, the calibration image 180 may be displayed on the TFT layer of the display circuitry 164. In one or more embodiments, the OCA layer 169 may be patterned to include the elements 182 of the calibration image 180. For example, the calibration image 180 may be embedded within the OCA layer 169. In other embodiments, the cover layer 168 may be patterned to include the elements 182 of the calibration image. For example, the calibration image 180 may be embedded within the cover layer 190. In other embodiments, the calibration image 180 may be embedded within or attached to the display device 160.

In various embodiments, each element (e.g., element 182) and the areas between the elements of the calibration image may correspond to one or more pixels 166 (FIGS. 1B, 1C). For example, each element and areas between the elements of the calibration image may correspond to an aggregate of two or more pixels 166.

In one or more embodiments, the elements (e.g., elements 182) of the calibration image correspond to illuminated area (illuminated portions) and non-illuminated areas (non-illuminated portions) of the display of the display device 160. For example, the area defined by the elements may correspond to one of the illuminated areas and non-illuminated areas and the areas between elements may correspond to the other of the illuminated and non-illuminated areas.

While the elements of the calibration image 180 are illustrated as comprising the elements 182, in other embodiments, the elements of the calibration image 180 may include one or more dots, lines, bars, circles, squares, rectangles, other shapes, or a combination thereof. In one embodiment, the elements of the calibration image 180 include one or more of a common size, shape and orientation. In other embodiments, one or more of the elements of the calibration image may differ in size, shape and/or orientation from another one or more of the elements. As will be discussed in further detail in the following, the calibration image 180 may be imaged by biometric sensing device 100 and utilized to by the processing system 110 to remove, compensate, or correct one or more distortions from an acquired image (e.g., a biometric image). In one or more embodiments, at least the center of each element of the calibration image 180 corresponds with correct known spacing of the pixels within the sensor 120 and may be used to correct an acquired image (e.g., a biometric image).

In various embodiments, the illuminated and non-illuminated areas of the calibration image 180 may be generated based on orthogonal codes. For example, the illuminated and non-illuminated areas may be generated utilizing a shift register driven with a signal generated by a pseudo random code. The length of the code may correspond to area of the display of the display device 160 that is driven with the calibration image 180.

Figure 2A:
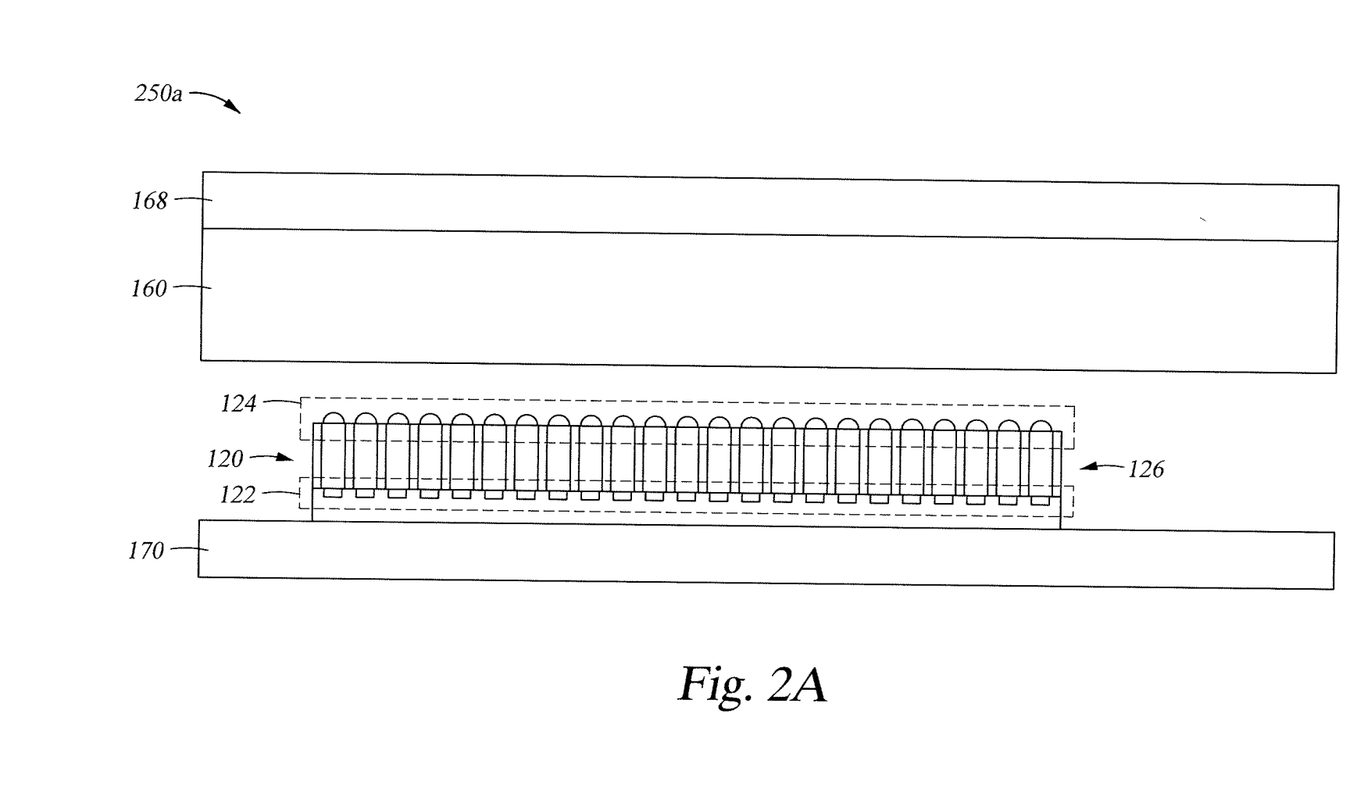
FIGS. 2A and 2B are schematic block diagrams of an electronic device, according to one or more embodiments.

FIG. 2A illustrates an embodiment of electronic device 250a, according to one or more embodiments. In the embodiment illustrated in FIG. 2A, the sensor 120 includes sensing elements 122, lenses 124 and a collimator filter layer 126. While FIG. 2A illustrates a sensor including a plurality of lenses 124, in one embodiment, the sensor 120 includes a single lens that is disposed over a two dimensional array of sensing elements 122 without requiring a collimator. More than one lens, mirror, or set of collimators may comprise one or more focusing elements between the sensing surface and the sensing elements.

In one embodiment, the sensor 120 is an imager, and the sensing elements 122 are the photodetectors, e.g., photodiodes, of the imager. Further, each photodetector may correspond to a pixel of the sensor 120. Alternatively, multiple photodetectors may be grouped to form each pixel of the sensor 120. The sensor 120 may include one or more additional layers, such as, one or more filter layers. In one embodiment, the sensor 120 includes one or more infrared (IR) filter layers disposed between the sensing elements 122 and the lenses 124. Furthermore, reflective mirror elements may also be used in place of refractive lens elements to focus the light.

In one embodiment, the sensing elements 122 are configured to convert light into a current signal and this signal may be accumulated into a charge (e.g. on a capacitor). In one or more embodiments, the sensing elements 122 are disposed in a two dimensional array on a substrate of the sensor 120. Further, the sensing elements 122 may be disposed as a matrix of pixels that may be controlled via select and readout lines to capture light and output the corresponding current signals. For example, each sensing element may be coupled to a select line to activate the sensing element for sensing and a readout line to output the current signal to an amplifier. In one or more embodiments, the amplifier converts the current signal or accumulated charge into a voltage signal. The amplifiers and/or other readout circuitry, e.g., analog-to-digital converters, multiplexers, and the like, may be disposed within an integrated circuit of the sensor 120 or within the sensor module 112.

The lenses 124 may be disposed above the sensing elements 122 and are configured to focus light (i.e. near a focus rather than at an imaging point) onto corresponding ones of the sensing elements 122. Further, the lenses 124 may be disposed in an array similar to or different from that of the sensing elements 122. In the illustrated embodiment, each of the lenses 124 is disposed above one of the sensing elements 122. However, in other embodiments, at least one of the lenses 124 is disposed above three or more sensing elements 122 arrayed in two dimensions where the sensing elements are in an image plane corresponding to a focal point of the lens and the sensing region. In various embodiments, the lenses 124 may be lenticular lenses or diffractive lenses. More than one focusing element (e.g. lens or focusing mirror) may lie in the light path from the sensing region to the sensing elements. In one embodiment, the lenses 124 may be configured to reflect light onto the sensing elements 122. In such an embodiment, the lenses 124 are disposed below sensing elements 122 such that the sensing elements 122 are between the cover layer 168 and the lenses 124. In one embodiment, the cover layer 168 is a sensing surface.

The collimator filter layer 126 is disposed between the lenses 124 and the sensing elements 122 and is configured to prevent crosstalk between adjacent sensing elements 122. In one or more embodiments, the collimator filter layer 126 may be configured to condition light using an array of apertures. The apertures may also be referred to collimator holes, collimator filter holes, collimator vias, or holes, among others. In one embodiment, the collimator filter layer 126 only allows light rays reflected at or near normal incidence to the collimator filter layer 126 to pass and reach the sensing elements 122. In one embodiment, the collimator filter layer 126 includes an opaque layer with an array of holes. Further, the collimator filter layer 126 may be laminated, stacked, or built directly above the sensing elements 122. In one or more embodiments, the collimator filter layer 126 is monolithic.

Figure 2B:
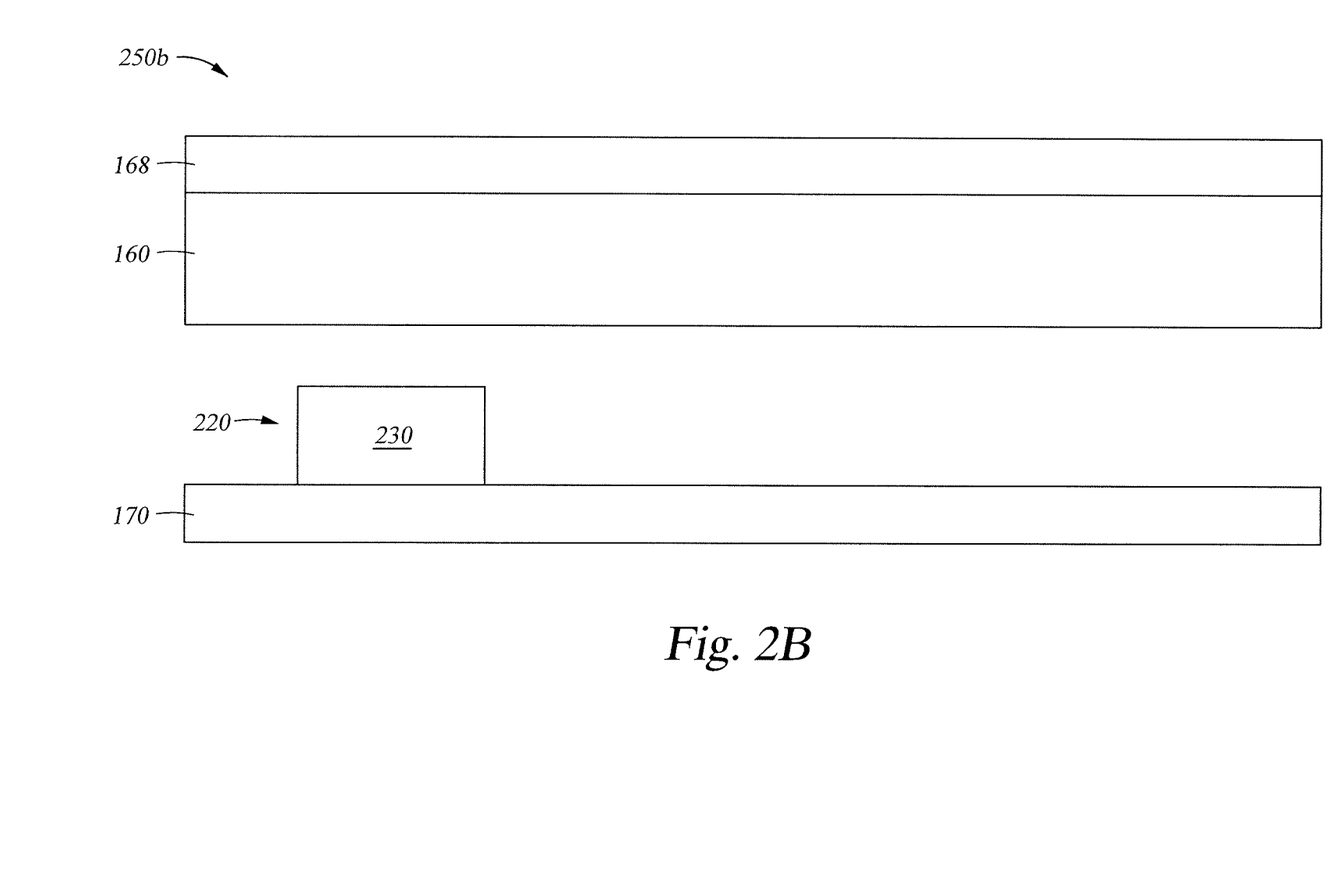

FIG. 2B illustrates an electronic device 250b, according to one or more embodiments. The electronic device 250b is configured similar to that of the electronic device 250a (FIG. 2A). However, the sensor 220 of the electronic device 250b includes a camera 230. For example, the camera 230 may be a CMOS or CCD image sensor, among others, as is described above.

The sensor 220 is coupled to the processing system 110 (FIG. 1A) similar to that of the sensor 120. In one embodiment, one or more elements of the processing system 110 may be part of the camera 230. For example, one or more of the sensor module 112, the determination module 114 and the template storage 116 may be part of the camera 230.

The camera 230 is configured to capture sensor data corresponding to an input object placed on the cover layer 168. Further, the camera 230 may be configured to capture sensor data corresponding to an image displayed on one or more layers of the display device 160 or the electronic device 250b. The sensor data captured by the camera 230 may be processed as is described with regard to FIG. 1.

Figure 3:
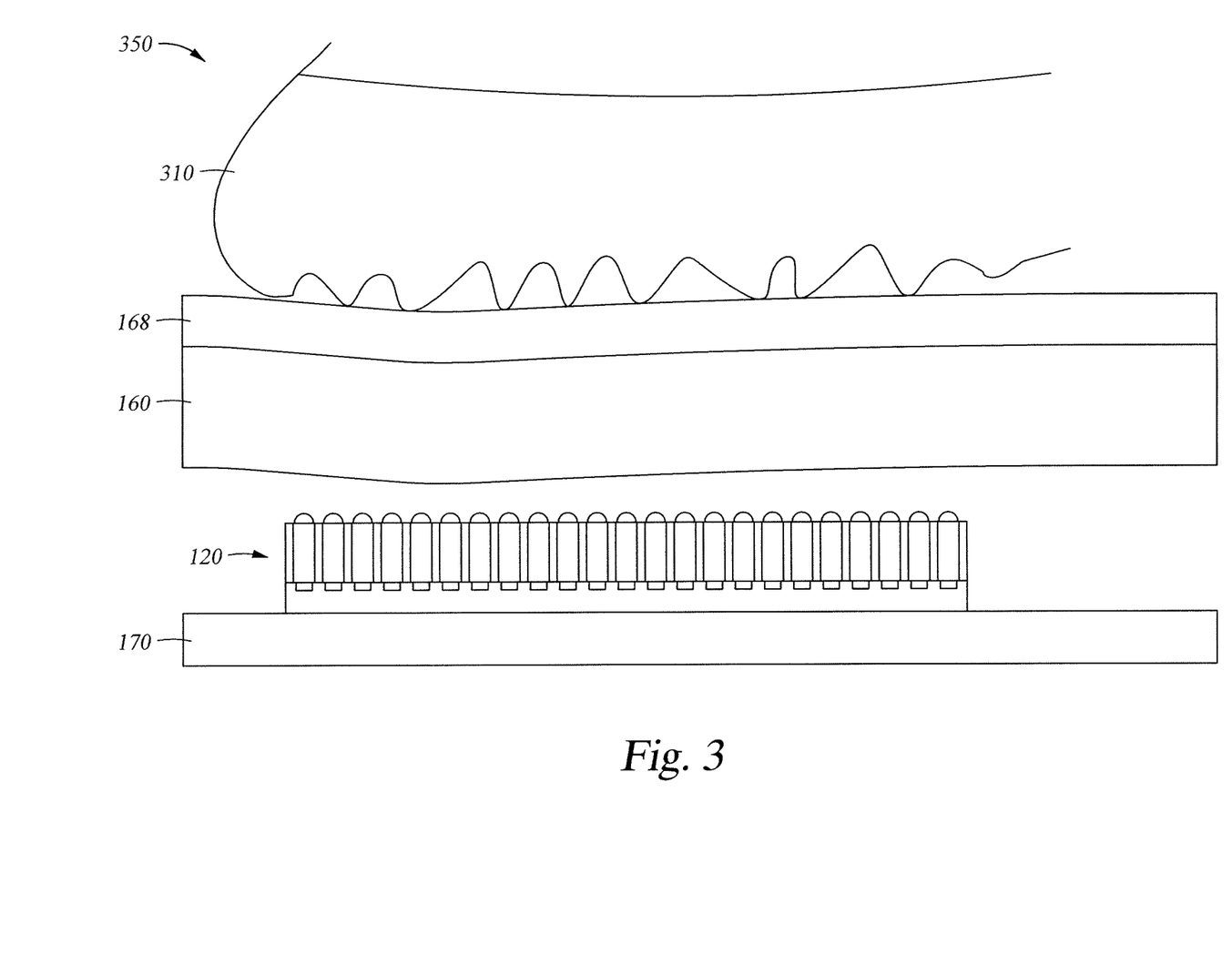
FIG. 3 is a schematic block diagram of an electronic device, according to one or more embodiments.

FIG. 3 illustrates an embodiment of the electronic device 350 that is experiencing deflection due to force applied by an input object 310. In such an embodiment, a fingerprint image of input object 310 captured by the sensor 120 may be distorted as the deflection causes the location of one or more portions of the input object 310 to be altered as compared to when no deflection occurs. For example, magnification (or demagnification) of a fingerprint image may vary corresponding to the amount of deflection of the display device 160, distorting the corresponding fingerprint image (e.g. by shifting the focal point of collimated light, by bending a cover lens relative to a focus to change the image plane). In other embodiments, the fingerprint image may experience other types of distortion. For example, the fingerprint image may experience distortion due to the shape of the lenses 124, changes in luminosity, and twisting, tilting and/or vertical motion of one or more layers within the display device 160 in response to deformation of the display device 160 relative to the sensor 120. In one embodiment, movement of the display device 160 relative to the sensor 120 may occur as the display device may be flexible. In one embodiment, the electronic device 350 may include the sensor 120 (FIG. 2A) instead of the sensor 220 (FIG. 2B).

Figure 4A:
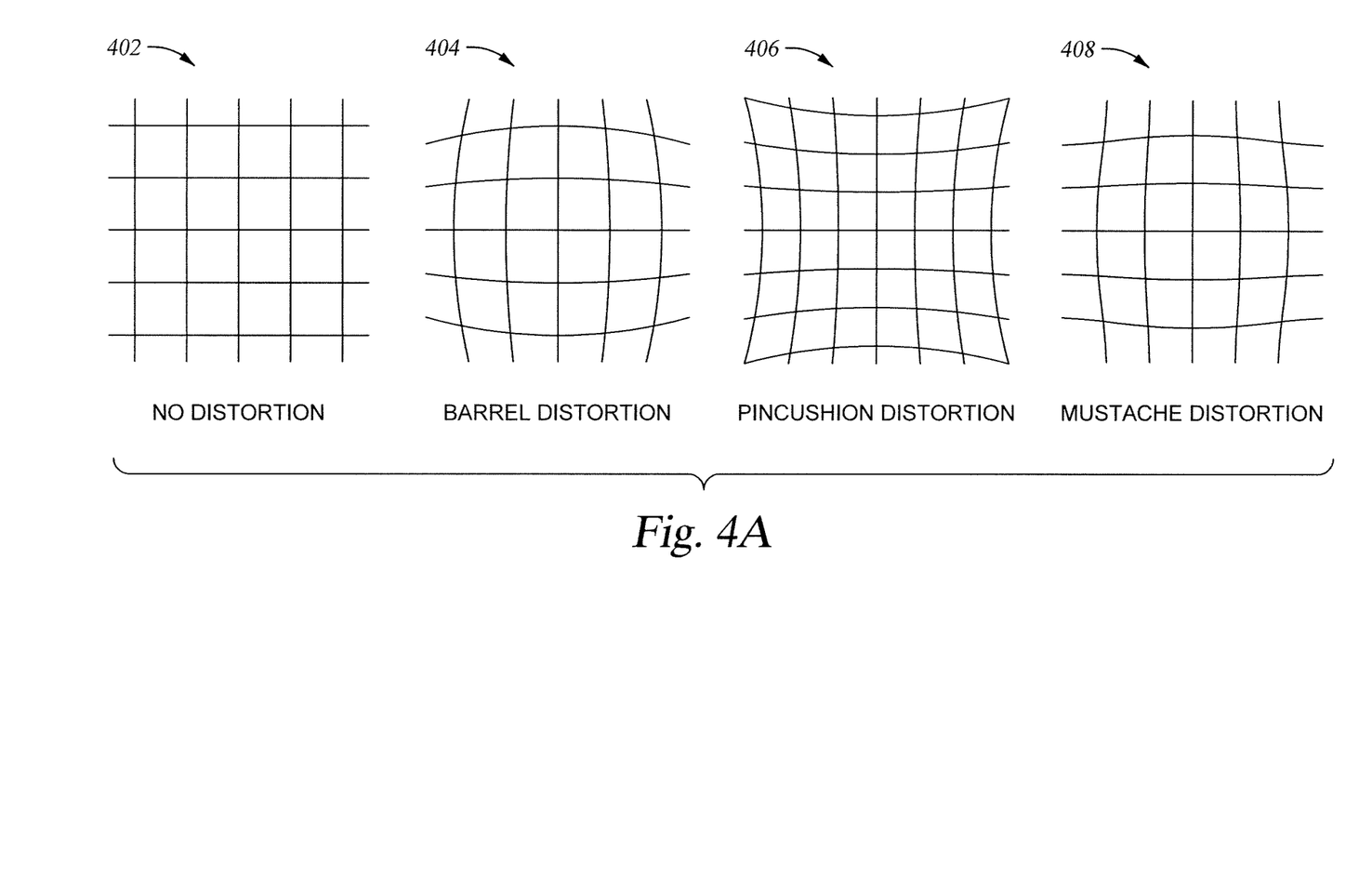
FIGS. 4A and 4B are images showing example types of distortion, according to one or more embodiments.

FIG. 4A illustrates various types of distortion for an example image. As shown in FIG. 4A, the image 402 includes no distortions, the image 404 includes barrel distortion where one or more portions of the image curves or bulges outward, the image 406 includes pincushion distortion where one or more portions of the image curves inward, and the image 408 includes mustache distortion where one or more portions of the fingerprint image curves outward and one or more portions of the fingerprint image curves inward. In one or more embodiments, a fingerprint image may experience at least one of these types of distortion due to the shape of the lenses 124, changes in luminosity, and twisting, tilting and/or vertical motion of one or more layers within the display device 160 in response to deformation of the display device 160 relative to the sensor 120.

Figure 4B:
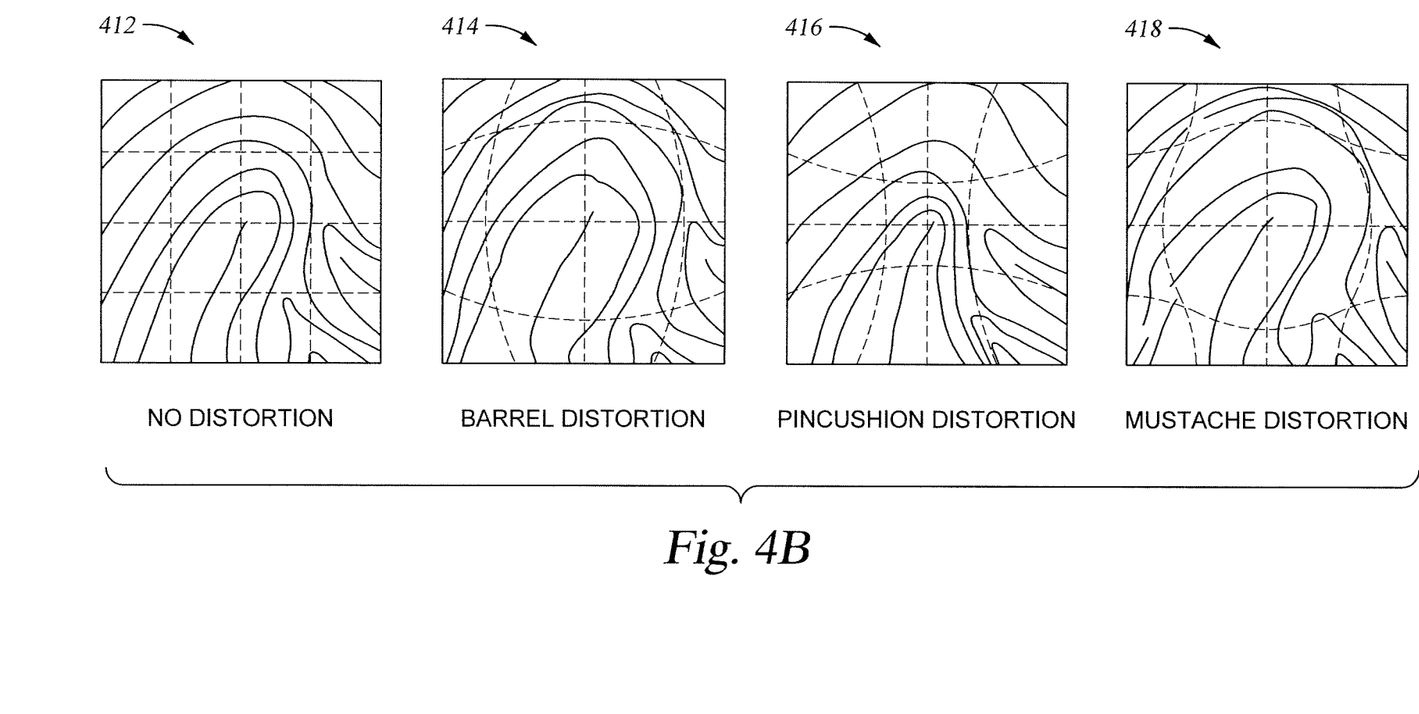

FIG. 4B illustrates a fingerprint image 412 having no distortion, a fingerprint image 414 experiencing barrel distortion, a fingerprint image experiencing pincushion distortion 416, and a fingerprint image experiencing mustache distortion 418. As is illustrated in FIG. 4B, a fingerprint image experiencing barrel distortion (e.g., fingerprint image 414) has one or more portions that curves outward as compared to a fingerprint image experiencing no distortion (e.g., fingerprint image 412). Note that a visible portion of an image without distortion is not dependent on translation or rotation, while a distorted image (e.g. with scale distortion within the image) is dependent on translation and rotation. Further, a fingerprint image experiencing pincushion distortion (e.g., fingerprint image 416) has one or more portions that curves inward as compared to a fingerprint image experiencing no distortion (e.g., fingerprint image 412). Additionally, a fingerprint image experiencing mustache distortion (e.g., fingerprint image 418) has one or more portions that curves inward and one or more portions that curves outward as compared to a fingerprint image experiencing no distortion (e.g., fingerprint image 412). Accordingly, removing distortions from the fingerprint image or sensor data prior to authentication being performed may increase the likelihood that a match is made between the fingerprint image and a template.

In other embodiments, a fingerprint image may experience other types of distortion, not shown in FIG. 4B. For example, a fingerprint image may experience luminosity distortion, where the brightness of one or more regions of the fingerprint image differs from that of another region of the fingerprint image. In one embodiment, luminosity distortion may correspond to vignetting, where one or more corners and/or edges of the fingerprint image are darker than other regions of fingerprint image. Further, the fingerprint image may experience magnification distortions, where one or more regions of the fingerprint image have a higher magnification than another region. In one or more embodiments, a fingerprint image may experience any combination of the above distortions. While FIGS. 4A and 4B are described with regard to fingerprint images, in other embodiments, similar description may be applied to other types of biometric images.

Figure 5:
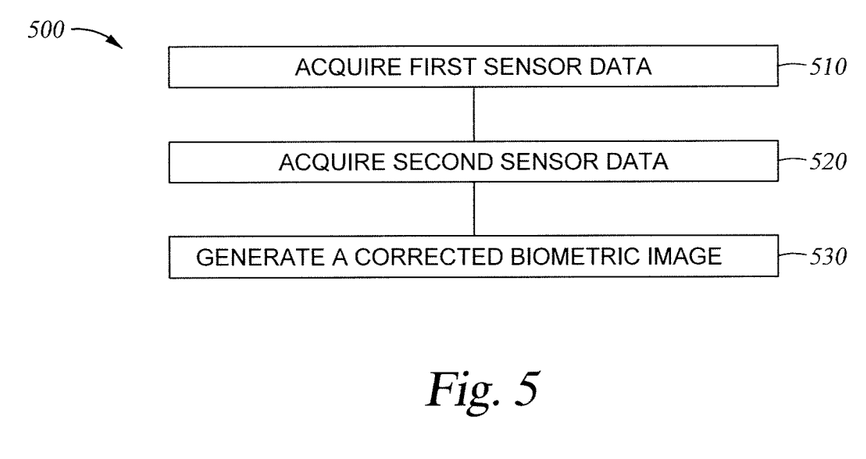
FIG. 5 illustrates a method for correcting a biometric image, according to one or more embodiments.

FIG. 5 illustrates a method 500 for reducing the effects of distortion within a fingerprint image, according to one or more embodiments. At step 510, first sensor data is acquired. For example, the first sensor data may be acquired by the biometric sensing device 100. In one embodiment, the display device 160 may illuminate the cover layer 168, and light reflected by the features of an input object (e.g., input object 310) may be received by the sensing elements 122 of the sensor 120. The light received by the sensing elements 122 may be converted into resulting signals and provided to the sensor module 112, and the sensor module 112 may generate first sensor data from the resulting signals. For example, the sensor circuitry of the sensor module 112 may receive resulting signals and convert the resulting signals from current signal to voltage signals to generate the first sensor data. In various embodiments, converting the resulting signals may include converting the resulting signals from a digital domain to an analog domain.

In one embodiment, a fingerprint image may be generated from the first sensor data. For example, processing system 110 may determine a biometric image from the first sensor data. The biometric image may be a fingerprint image. Alternatively, the biometric image may be other types of images which may be used to authenticate or identify a user. In one embodiment, the determination module 114 may receive the first sensor data from the sensor module 112 and generate a biometric image from the first sensor data. The biometric image may include one or more distortions. For example, the biometric image may include distortions due to a deformation of the sensing surface (e.g., the cover layer 168 of FIG. 1B), where the sensing surface deflects toward the sensor 120, as shown in FIG. 3. Further, in one or more embodiments, the deflection may not be uniform such that portions of the sensing surface may be deflected more than other portions of the sensing surface.

In various embodiments, deflection of the sensing surface may distort the biometric image. For example, the biometric image may experience one or more of barrel distortion, pincushion distortion, mustache distortion, magnification distortion and luminosity distortion. Due to the distorted fingerprint image, the processing system 110 may not be able to authenticate a user, undesirably resulting in a valid user being rejected. For example, a determination may be made that the distorted biometric image does not match one of the stored templates, resulting in the user not being authenticated.

At step 520 second sensor data is acquired. For example, the second sensor data may be acquired by the biometric sensing device 100. In one embodiment, the sensor module 112 instructs the sensor 120 to receive resulting signals while a calibration image (e.g., the calibration image 180) is displayed by the display device 160. The resulting signals may be provided to the sensor module 112 and converted into second sensor data. In one embodiment, the display driver module 118 may instruct the sensor module 112 to provide a first instruction indicating a starting time of when the calibration image is displayed and a second instruction indicating an ending time of when the calibration image is displayed. The sensor module 112 may provide an instruction to the sensor 120 to acquire resulting signals during a period of time that occurs between the starting time and ending time of when the calibration image is displayed.

At step 530, a corrected biometric image is generated. In one embodiment, the corrected biometric image may be generated based at least in part on the biometric image and the second sensor data. In one or more embodiments, the determination module 114 may determine a correction coefficient from the second sensor data.

In one embodiment, the correction coefficient may correspond to a geometric model that is generated from the second sensor data. For example, the determination module 114 may receive the second sensor data from sensor module 112 and may determine one or more measurements of the calibration image from the sensor data. In various embodiments, referencing the calibration image 180 in FIG. 1D, the determination module 114 may determine the width 183 and/or the height 184 of any one or more of the elements (e.g., elements 182) of the calibration image 180, and/or the distance between two or more elements (e.g., the distance 185 and the distance 186). Further, the determination module 114 may be configured to determine an orientation of one or more features of the calibration image 80 and/or the location of one or more features of the calibration image.

In one or more embodiments, the determination module 114 may determine a distance between one or more features of the calibration image 180. For example, a distance 185 and/or 186 may be calculated between each parallel side of the each element 182 of the calibration image 180. In other embodiments, the distances may correspond to the distances and/or size of any other features within the calibration image. For example, the distances may be determined between the center of each element. The distances may be calculated for different portions of the calibration image. For example, a first distance may be calculated for a portion of the calibration image that corresponds to where the display device 160 experiences a first amount of deflection and a second distance may be calculated for a portion of the calibration image that corresponds to where the display device 160 experiences a second amount of deflection different than the first amount of deflection. The first portion of the calibration image may correspond to an edge region of the display device 160, and the second portion of the calibration image may correspond to an inner region of the display device 160. The edge region of the display device 160 may experience less deflection than an inner region of the display device 160.

The determination module 114 may further determine a correction coefficient from the calculated distance. In one or more embodiments, the determination module 114 may calculate one or more correction coefficients from the calculated distances. For example, a different correction coefficient may be calculated for different portions of the calibration image such that different amounts of distortion may be removed from corresponding portions of the fingerprint image. One method of determining a local distortion of the calibration image is to measure autocorrelation for a windowed portion of the image with a similarly windowed undistorted calibration image, which may be premeasured or precalculated. By maximizing the autocorrelation of scaled, rotated, or offset calibration images the local distortion can be estimated. Another method of determining local distortion is applying spatial 2D Fourier Transform techniques (e.g. on windowed portions of the calibration image) to determine spatial phase and frequency changes caused by distortion. A variety of optimization and convolutional techniques can be used to determine the distortion of the larger area calibration image by local estimation of scale, rotation, and offset. Multiple local estimations may be combined or interpolated to determine distortion (e.g. scale, rotation, offset, gamma etc.) at each pixel of the as measured distorted calibration image. Compensating coefficients to correct the distortion (e.g. un-scale, un-rotate, un-offset, de-gamma) may then be determined from the measured distortion of the calibration image. In one embodiment, coefficients of Brown's distortion model (e.g. Brown-Conrady model) may be extracted to correct radial and tangential distortion. 180 such that different amounts of distortion may be removed from corresponding portions of the fingerprint image.

The determination module 114 may apply the correction coefficient to the biometric image to generate the corrected fingerprint image. Applying the correction coefficients to the biometric image may correct distortions within the biometric image. In one embodiment, applying the correction coefficients to the biometric image comprises comparing the distances calculated from the different regions of the calibration image to similar regions of the biometric image and adjusting the biometric image based on the correction coefficient. For example, distances between areas of the biometric image which correspond to the features of the calibration image may be reduced or increased based on the correction coefficient(s). In various embodiments, the features of the calibration image may correspond to the pixels of the biometric image. For example, the distance between features or between centers of features of the calibration image may correspond to the distance between pixels of the biometric image. In one embodiment, the features of the calibration image correspond to the distance between every two or more pixels. For example, the features of the calibration image correspond to the distance between two pixels which are separated by one or more pixels. Further, the placement, size and number of features of the calibration image may correspond to the distances of pixels of the biometric image that are to be measured. It may be useful to up-sample (e.g. to 1.5×, 2×, 3×, 4×, etc.) the image to a higher resolution for compensating distorted fingerprint image to an undistorted fingerprint image, although it may also be useful after compensation to down-sample (e.g. back to the original resolution) for matching.

In one embodiment, the determination module 114 may increase the distance between pixels of a biometric image that is determined to be less than the distance of the correction coefficient and/or decrease the distance between pixels of a biometric image that is determined to be greater than the distance of the correction coefficient. Further, the determination module 114 may increase or decrease the distance between the pixels of the biometric image by a common amount based on the correction coefficient. In another embodiment, a local rotation and scaling matrix (e.g. interpolated form calibration data) composed of correction coefficients may be used to compensate (e.g. unwarp) the image or an up-sampled image by changing the local basis.

In one embodiment, the determination module 114 may generate a correction image from the second sensor data. For example, the correction image may be utilized to correct distortion within the biometric image. Further, the determination module 114 may compare the correction image to the first sensor data to generate the corrected biometric image. In one embodiment, the determination module 114 is configured to generate a biometric image from the first sensor data and compare the biometric image with the correction image. For example, the determination module 114 may measure one or more features of the correction image and utilized those measurements to adjust the fingerprint image and generate a corrected fingerprint image. The relative brightness correction (e.g. due to illumination, vignetting, etc.) of the calibration image along with the local basis warping (e.g. from radial and tangential lens distortion) corrections extracted from the calibration image and used to compensate the biometric image and generate a corrected biometric image. For example, a measured distance between first and second points of the correction image may be compared to the distance between to corresponding points of the biometric image. The position of the points relative to each other within the biometric image may be adjusted, such that the distance between points of the biometric image is similar to the measured distance between the points of the correction image. In one embodiment, one or more regions of the correction image may be compared to corresponding regions of the biometric image to generate a corrected fingerprint image.

In one embodiment, the determination module 114 may determine the correction image by adjusting the elements of the correction image such that the elements of the correction image match up corresponding elements of the displayed calibration image. For example, the determination module 114 may adjust one or more of the size, shape, and location of the elements of the correction image such each element of the correction image matches a corresponding element of the calibration image. The amount that each element of the correction image is adjusted may be used to generate the corrected biometric image. For example, the first sensor data may be adjusted based on the amount that the elements of the correction image were adjusted. In one embodiment, a biometric image generated from the first sensor is adjusted based on the amount that elements of the correction image were adjusted. For example, the location of one or more pixels of the biometric image may be adjusted based on the amount that the one or more elements of the correction image were adjusted. In one embodiment, the location of one or more pixels of the biometric image may be adjusted according to the amount that elements in a corresponding portion of the correction image were adjusted.

In one embodiment, the determination module 114 may compare the corrected fingerprint image to one or more user templates stored within template storage 116. Based upon a determination that the corrected biometric image matches one or more of the user templates, a user may be one or more of authenticated, verified, validated, certified, authorized, and identified, among others.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

What is claimed is:

1. A method for compensation for distortion in a biometric image, the method comprising:
   acquiring first sensor data from a sensing device;
   generating the biometric image based at least in part on the first sensor data;
   acquiring second sensor data from the sensing device, the second sensor data corresponding to a calibration image displayed on a display device, wherein the calibration image comprises elements associated with pixels of the display device; and
   generating a corrected biometric image based at least in part on the biometric image and the second sensor data.

2. The method of claim 1, further comprising authenticating a user based at least in part on the corrected biometric image.

3. The method of claim 1, further comprising:
   generating one or more correction coefficients from the second sensor data; and
   adjusting the biometric image based at least in part on the one or more correction coefficients.

4. The method of claim 1, further comprising generating a correction image from the second sensor data.

5. The method of claim 4, wherein generating the corrected biometric image comprises comparing the biometric image with the correction image.

6. The method of claim 5, wherein comparing the biometric image with the correction image comprises comparing a first portion of the biometric image with a first portion of the correction image.

7. The method of claim 1, wherein acquiring the first sensor data from the sensing device comprises:
illuminating a sensing surface; and
detecting light reflected by one or more features of an input object at the sensing surface.

8. The method of claim 1, wherein acquiring the second sensor data from the sensing device comprises
acquiring the second sensor data while the calibration image is displayed on the display device.

9. The method of claim 8, wherein the elements further correspond to illuminated and non-illuminated portions of the calibration image.

10. An electronic device comprising:
a display device;
a sensor; and
a processing system coupled to the sensor, the processing system configured to:
receive first sensor data from the sensor;
generate a biometric image based at least in part on the first sensor data;
receive second sensor data from the sensor, the second sensor data corresponding to a calibration image displayed on the display device, wherein the calibration image comprises elements associated with pixels of the display device; and
generate a corrected biometric image based at least in part on the biometric image and the second sensor data.

11. The electronic device of claim 10, wherein the processing system is figure configured to authenticate a user based at least in part on the corrected biometric image.

12. The electronic device of claim 10, wherein the sensor comprises a plurality of sensing elements disposed on a first substrate, and wherein the first substrate is coupled to the display device.

13. The electronic device of claim 10, wherein the processing system is further configured to generate one or more correction coefficients from the second sensor data, and wherein generating the corrected biometric image comprises adjusting the biometric image based at least in part on the one or more correction coefficients.

14. The electronic device of claim 10, wherein the processing system is further configured to generate a correction image from the second sensor data, and wherein generating the corrected biometric image comprises comparing the biometric image with the correction image.

15. The electronic device of claim 10, wherein the processing system is further configured to acquire the second sensor data while the calibration image is displayed on the display device.

16. A processing system for a biometric sensing device, the processing system comprising:
a sensor module comprising sensor circuitry, the sensor module configured to:
receive first sensor data from a plurality of sensing elements; and
receive second sensor data from the plurality of sensing elements while a calibration image is displayed on a display device, wherein the calibration image comprises elements associated with pixels of the display device, and wherein the second sensor data corresponds to the calibration image; and
a determination module configured to:
generate a biometric image from the first sensor data; and
generate a corrected biometric image based at least in part on the biometric image and the second sensor data.

17. The processing system of claim 16, wherein the determination module is further configured to authenticate a user based at least in part on the corrected biometric image.

18. The processing system of claim 16, wherein the determination module is further configured to generate one or more correction coefficients from the second sensor data, and wherein generating the corrected biometric image comprises adjusting the biometric image based at least in part on the one or more correction coefficients.

19. The processing system of claim 16, wherein the determination module is further configured to generate a correction image from the second sensor data, and wherein generating the corrected biometric image comprises comparing the biometric image with the correction image.

20. The processing system of claim 16, wherein the sensor module is further configured to receive the first sensor data by detecting light reflected by one or more features of an input object.

* * * * *